(12) United States Patent
Sedlack

(10) Patent No.: US 6,913,313 B2
(45) Date of Patent: Jul. 5, 2005

(54) INFANT CAR SEAT HANDLE AND HANDLE LOCK MECHANISM

(75) Inventor: Mark Sedlack, Cuyahoga Falls, OH (US)

(73) Assignee: Baby Trend, Inc., Ontario, CA (US)

(*) Notice: Subject to any disclaimer, the term of this patent is extended or adjusted under 35 U.S.C. 154(b) by 0 days.

(21) Appl. No.: 10/152,926

(22) Filed: May 21, 2002

(65) Prior Publication Data
US 2003/0164627 A1 Sep. 4, 2003

Related U.S. Application Data

(60) Provisional application No. 60/362,624, filed on Mar. 4, 2002.

(51) Int. Cl.[7] .............................................. A47C 31/00
(52) U.S. Cl. .................. 297/183.4; 297/377; 297/183.1; 297/183.2
(58) Field of Search ............................... 16/110 R, 126; D6/333, 213; 280/30, 650, 31; 297/183.1, 183.2, 183.3, 183.4, 183.6, 250.1

(56) References Cited

U.S. PATENT DOCUMENTS

| | | | |
|---|---|---|---|
| 2,269,696 A | | 1/1942 | Shaulson |
| 2,269,969 A | | 1/1942 | Shaulson |
| 3,912,329 A | | 10/1975 | Connors et al. |
| 4,237,174 A | | 12/1980 | Lagardere et al. |
| D285,383 S | | 9/1986 | Anthony |
| 5,007,141 A | | 4/1991 | Gentes |
| 5,058,283 A | | 10/1991 | Wise et al. |
| 5,265,910 A | | 11/1993 | Barr et al. |
| 5,324,094 A | | 6/1994 | Kain |
| 5,409,292 A | * | 4/1995 | Kain et al. ............... 297/183.1 |
| 5,432,985 A | | 7/1995 | Bernart |
| 5,516,190 A | | 5/1996 | Kain et al. |
| 5,544,935 A | | 8/1996 | Cone, II et al. |
| 5,651,581 A | | 7/1997 | Myers et al. |
| 5,658,044 A | | 8/1997 | Krevh |
| D389,286 S | | 1/1998 | Celestina-Krevh et al. |
| 5,733,004 A | | 3/1998 | Celestina-Krevh et al. |
| 5,803,535 A | | 9/1998 | Jane Cabagnero |
| 5,806,924 A | | 9/1998 | Gonas |
| 5,839,793 A | | 11/1998 | Merrick et al. |
| 5,863,097 A | * | 1/1999 | Harper et al. ............. 297/260.2 |
| 5,887,950 A | | 3/1999 | Kuo |
| D408,961 S | | 5/1999 | Myers |
| 5,961,180 A | * | 10/1999 | Greger et al. ............. 297/183.4 |
| 5,971,476 A | | 10/1999 | Gibson et al. |
| 6,070,890 A | | 6/2000 | Haut et al. |
| 6,092,265 A | | 7/2000 | Sesay |
| 6,139,101 A | | 10/2000 | Berringer et al. |
| 6,145,927 A | * | 11/2000 | Lo ........................... 297/250.1 |
| 6,318,799 B1 | | 11/2001 | Greger et al. |
| 6,331,032 B1 | | 12/2001 | Haut et al. |
| 6,425,632 B1 | | 7/2002 | Anthony et al. |
| 6,443,522 B1 | * | 9/2002 | Kain et al. ............. 297/184.17 |

FOREIGN PATENT DOCUMENTS

DE          3112458 A1    10/1982

* cited by examiner

Primary Examiner—Peter M. Cuomo
Assistant Examiner—Erika Garrett
(74) Attorney, Agent, or Firm—Knobbe, Martens, Olson & Bear, LLP

(57) ABSTRACT

An infant car seat is provided, comprising a seat shell and a handle comprising a grip portion and a pair of handle arms extending from the grip portion. Each of the handle arms is rotatably connected to the seat shell at an end of the handle arm opposite the grip portion. The grip portion comprises a first grip section that extends generally perpendicular to a central longitudinal axis of the seat shell, a second grip section and a third grip section. The second and third grip sections extend inwardly towards the central longitudinal axis from opposite ends of the first grip section.

27 Claims, 6 Drawing Sheets

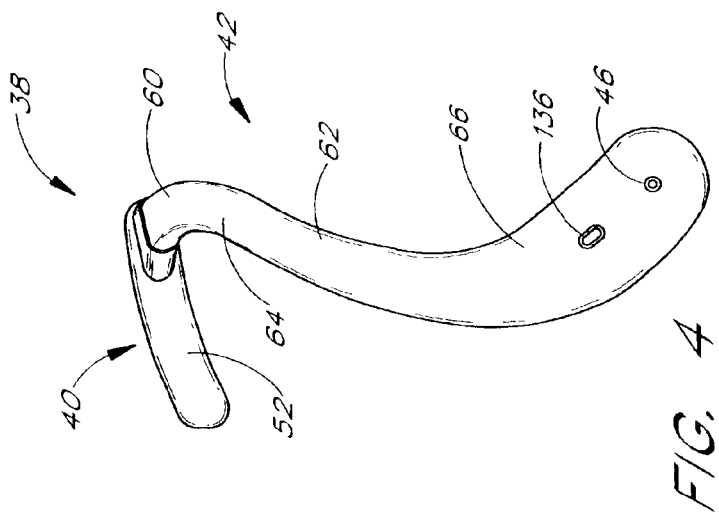
FIG. 4
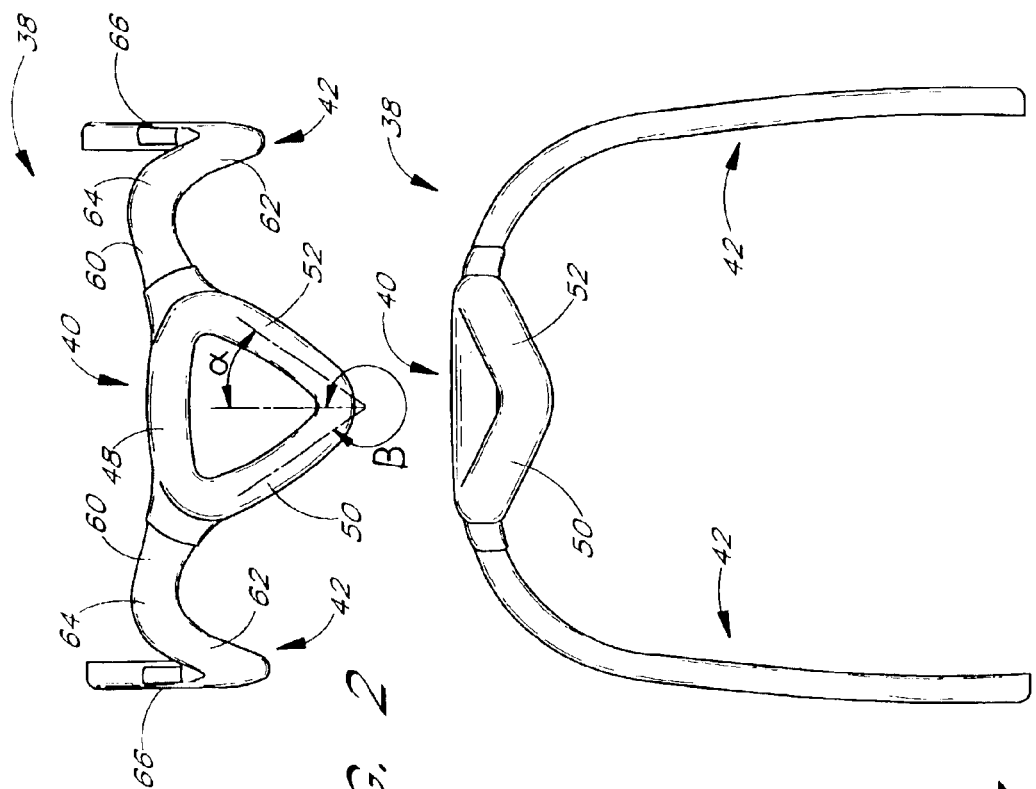
FIG. 2
FIG. 3

INFANT CAR SEAT HANDLE AND HANDLE LOCK MECHANISM

REFERENCE TO RELATED APPLICATION

This application claims priority to U.S. Provisional Application No. 60/362,624, filed Mar. 4, 2002, the entire disclosure of which is hereby incorporated by reference herein.

BACKGROUND OF THE INVENTION

1. Field of the Invention

The invention relates to infant car seats and, more particularly, to handle assemblies for infant car seats.

2. Description of the Related Art

Infant car seats are commonly used to conveniently and safely seat and transport infants and small children. Such infant car seats generally comprise a molded plastic seat shell including a seating surface for supporting the infant and a U-shaped handle that extends transversely across the seat shell. The handle is typically rotatably connected to the sides of the seat shell by rivets or other fasteners.

A lock mechanism is typically provided at the ends of the handle to lock the handle in various rotational positions relative to the seat shell. Generally, the handle is locked in place above the seat shell when the car seat is being carried. The handle is generally locked in place behind the seat shell when the car seat is positioned, for example, on the seat of a vehicle.

A user places the infant in the seat shell and grasps the handle to lift and transport the infant and car seat. Because the handle traverses the car seat, the user must rotate his or her carrying hand so that the palm of the hand faces either forwardly in the direction of travel of the user or rearwardly away from the direction of travel. Both of these hand positions are unnatural and, if the user is required to carry the infant a substantial distance or for a substantial period of time, the user's carrying arm, wrist, and hand can quickly become fatigued. In addition, because of the natural hand position of the person carrying the seat, the car seat tends to rotate and bang against the legs of the user as the user walks with the car seat.

Various handles have been designed to provide a more comfortable hand position for the user. For example, in one existing handle design, a grip portion of the handle extends longitudinally, rather than transversely, with respect to the seat shell so that the user's palm faces inwardly towards the user's side when transporting the car seat. While this and other existing handle designs are more ergonomic than the transversely extending handle design, further improvements are necessary.

Another problem with existing handles is that the lock mechanisms associated with such handles are typically complex and sometimes fail to engage properly. In addition, the lock mechanisms typically comprise a number of plastic components that, even when properly engaged, sometimes fail under load. If the lock mechanism fails, the seat shell can rotate suddenly and cause injury to the infant, especially if the infant is not securely buckled into the car seat.

SUMMARY OF THE INVENTION

In accordance with one aspect of the present invention, an infant car seat is provided comprising a seat shell and an ergonomically shaped handle. The handle comprises a generally triangular grip portion and a pair of handle arms that extend from the grip portion. Each of the handle arms is rotatably connected to the seat shell at an end of the handle arm opposite the grip portion.

In accordance with another aspect of the present invention, an infant car seat is provided, comprising a seat shell and a handle comprising a grip portion and a pair of handle arms extending from the grip portion. Each of the handle arms is rotatably connected to the seat shell at an end of the handle arm opposite the grip portion. The grip portion comprises a first grip section that extends generally perpendicular to a central longitudinal axis of the seat shell, a second grip section and a third grip section. The second and third grip sections extend inwardly towards the central longitudinal axis from opposite ends of the first grip section.

In accordance with another aspect of the present invention, an infant car seat is provided comprising a seat shell and a handle comprising a grip portion and a pair of handle arms extending from the grip portion. Each of the handle arms is rotatably connected to the seat shell at an end of the handle arm opposite the grip portion. A handle lock mechanism is associated with at least one of the handle arms. The handle lock mechanism comprises a latch that is slidably connected to the handle arm. The latch comprises a tab that extends towards the seat shell. A plurality of locking surfaces are associated with the seat shell. An actuator is operable to slide the latch between a first position wherein the tab interferes with the locking surfaces to prevent rotation of the handle with respect to the seat shell, and a second position wherein the tab does not interfere with the locking surfaces and the handle is allowed to rotate with respect to the seat shell. A biasing member is provided to bias the latch towards the first position.

BRIEF DESCRIPTION OF THE DRAWINGS

FIG. 2 is a top plan view of the handle assembly of the infant car seat of FIG. 1;

FIG. 3 is a front elevational view of the handle assembly;

FIG. 4 is a left side elevational view of the handle assembly;

DETAILED DESCRIPTION OF THE PREFERRED EMBODIMENT

Figure 1:
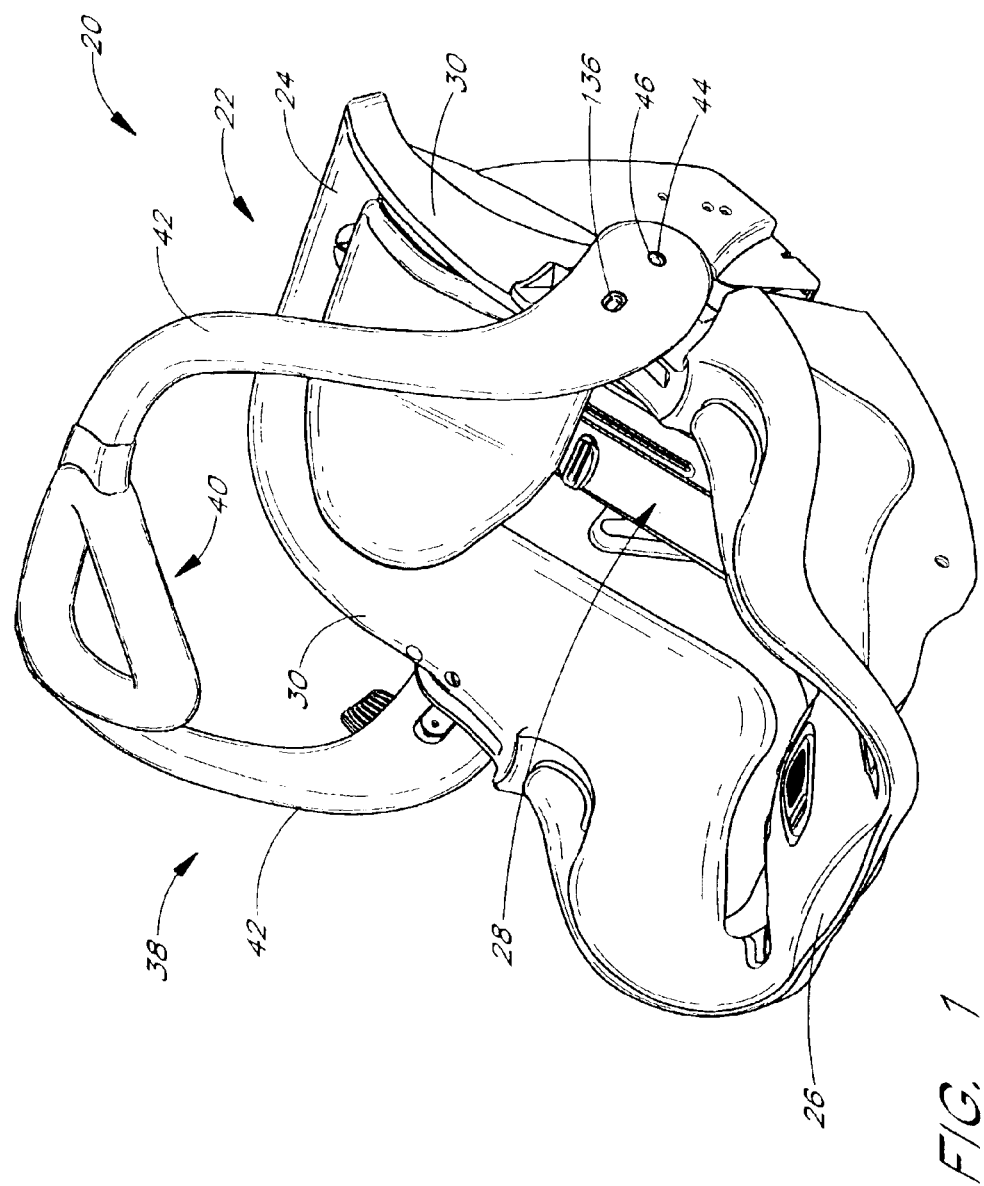
FIG. 1 is a perspective view of one preferred embodiment of an infant car seat having certain features in accordance with the present invention.

One embodiment of an infant car seat having certain features and advantages of the present invention is illustrated in FIG. 1. In the illustrated embodiment, the infant car seat 20 comprises a molded plastic seat shell 22 having a head end 24 and a foot end 26. The seat shell 22 includes a seating surface 28 and a pair of side walls 30. The seating surface 28 and the side walls 30 preferably are covered with a removable padding material (not shown) to comfortably support an infant in the seat shell 22. A handle assembly 38 is rotatably connected to the side walls 30 and extends transversely across the seat shell 22.

As illustrated in FIG. 1, the handle assembly 38 comprises a central grip portion 40 and a pair of handle arms 42 that extend towards the seat shell 22 from the grip portion 40. Rivets 44 or other suitable fasteners extend through openings in the ends of the handle arms 42 opposite the grip portion 40 to rotatably connect the handle assembly 38 to the seat shell 22 in a manner to be described below.

With reference now to FIGS. 2–4, in the illustrated embodiment, the grip portion 40 of the handle assembly 38 is generally triangular in shape. In the preferred embodiment illustrated in FIGS. 2–4, the grip portion 40 includes a first grip section 48 that extends in a direction generally perpendicular to a longitudinal axis of the seat shell 22. A second grip section 50 and a third grip section 52 extend inwardly towards the central longitudinal axis of the seat shell 22 from opposite ends of the first grip section 48. Preferably, as best illustrated in FIG. 4, the second and third grip sections 50, 52 are curved slightly towards the handle arms 42. The grip portion 40 desirably is over-molded with a non-slip material such as a thermoplastic elastomer (TPE) or thermoplastic rubber (TPR) to provide a better and more comfortable grip of the handle assembly 38.

As best illustrated in FIGS. 2 and 4, each of the handle arms 42 of the illustrated handle assembly 38 includes a first arm portion 60 that extends slightly forwardly (i.e., towards the head end 24 of the seat shell 22) from the first grip section 48 when the handle assembly 38 is positioned above the seat shell 22. A second arm portion 62 extends rearwardly (i.e., towards the foot end 26 of the seat shell 22) from the first arm portion 60, forming a curved section 64 between the first and second arm portions 60, 62. A third arm portion 66 extends forwardly from the second arm portion 62.

Figure 5:
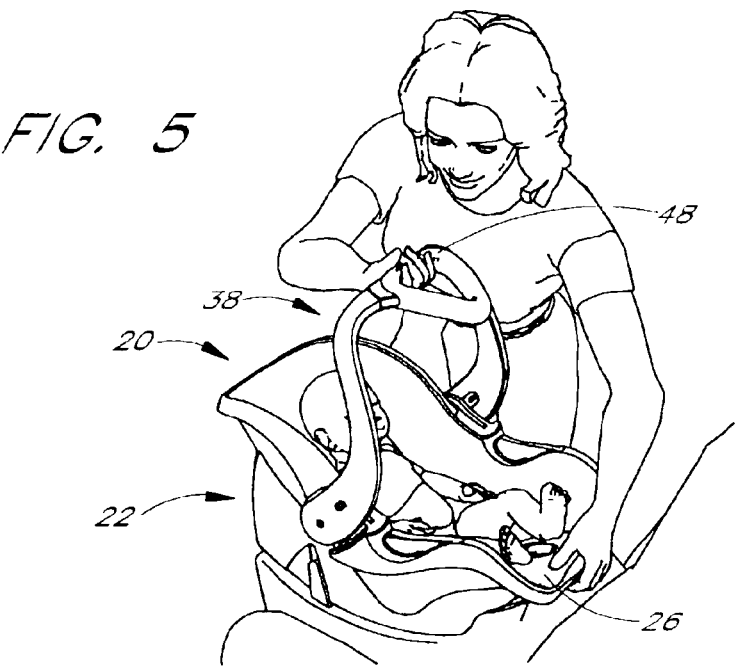
FIG. 5 is a perspective view illustrating a preferred method of lifting the infant car seat out of a vehicle.
Figure 6:
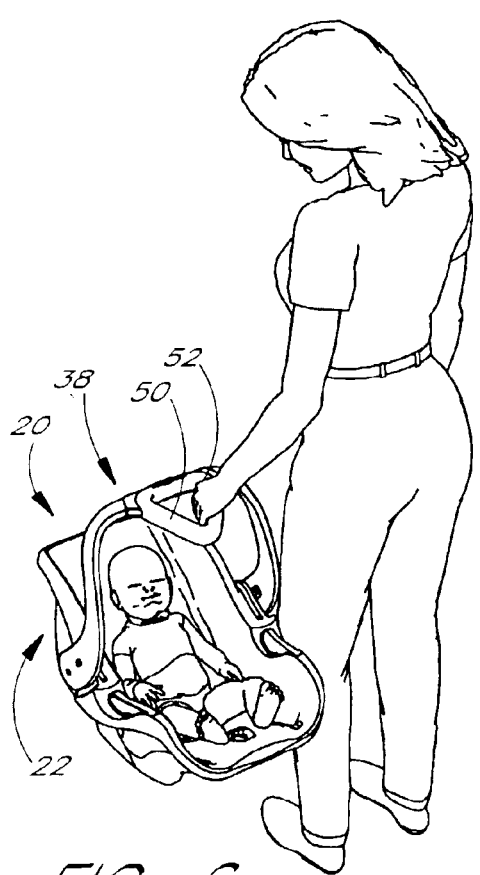
FIG. 6 is a perspective view illustrating a preferred method of carrying the infant car seat.
Figure 7:
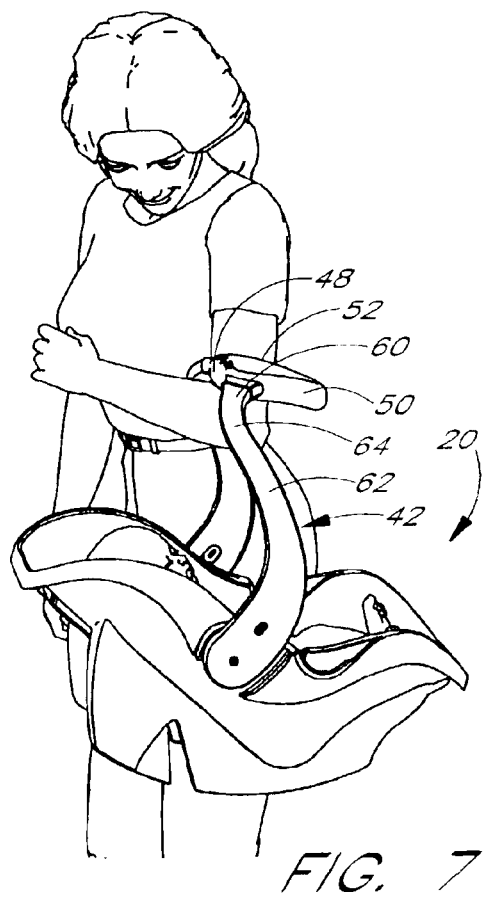
FIG. 7 is a perspective view illustrating another preferred method of carrying the infant car seat.

With reference now to FIGS. 5–7, the shape of the handle assembly 38 allows the infant car seat 20 to be transported conveniently and comfortably in a number of different ways. As illustrated in FIG. 5, the first grip section 48 provides a comfortable hand position for a user to lift or lower the car seat 20, for example, to place the car seat 20 in or remove the car seat 20 from a vehicle. The user can place one hand on the first grip section 48 and another hand under the foot end 26 of the seat shell 22 to grasp the car seat 20 with a strong, two-handed grip.

The second and third grip sections 50, 52 provide comfortable hand positions for the user to carry the infant car seat 20 in a single-handed fashion, as illustrated in FIG. 6. Preferably, the second and third grip sections 50, 52 are angled with respect to the longitudinal axis of the car seat 20 at approximately the natural anatomical angle of the hand relative to the body when the arm is at rest at the side of the body. In the illustrated embodiment, the first, second and third grip sections 48, 50, 52 are approximately the same length and form an equilateral triangle, as best illustrated in FIG. 2. Accordingly, the third grip section 52 extends at an angle $\alpha$ with respect to the central longitudinal axis of the car seat of approximately 30 degrees, and the second grip section 50 extends at an angle $\beta$ with respect to the central longitudinal axis of approximately 330 degrees.

The user can grip the second grip section 50 when carrying the infant car seat 20 with the user's right hand or, as illustrated in FIG. 6, grip the third grip section 52 when carrying the infant car seat 20 with the user's left hand. This results in a more ergonomic and less fatiguing arm position and aligns the longitudinal axis of the car seat 20 with the direction of travel of the user to prevent the seat shell 22 from banging against the user's legs.

As illustrated in FIG. 7, the curved section 64 between the first and second arm portions 60, 62 of each of the handle arms 42 allows the infant car seat 20 to be comfortably carried in the crook of the user's elbow.

Figure 8:
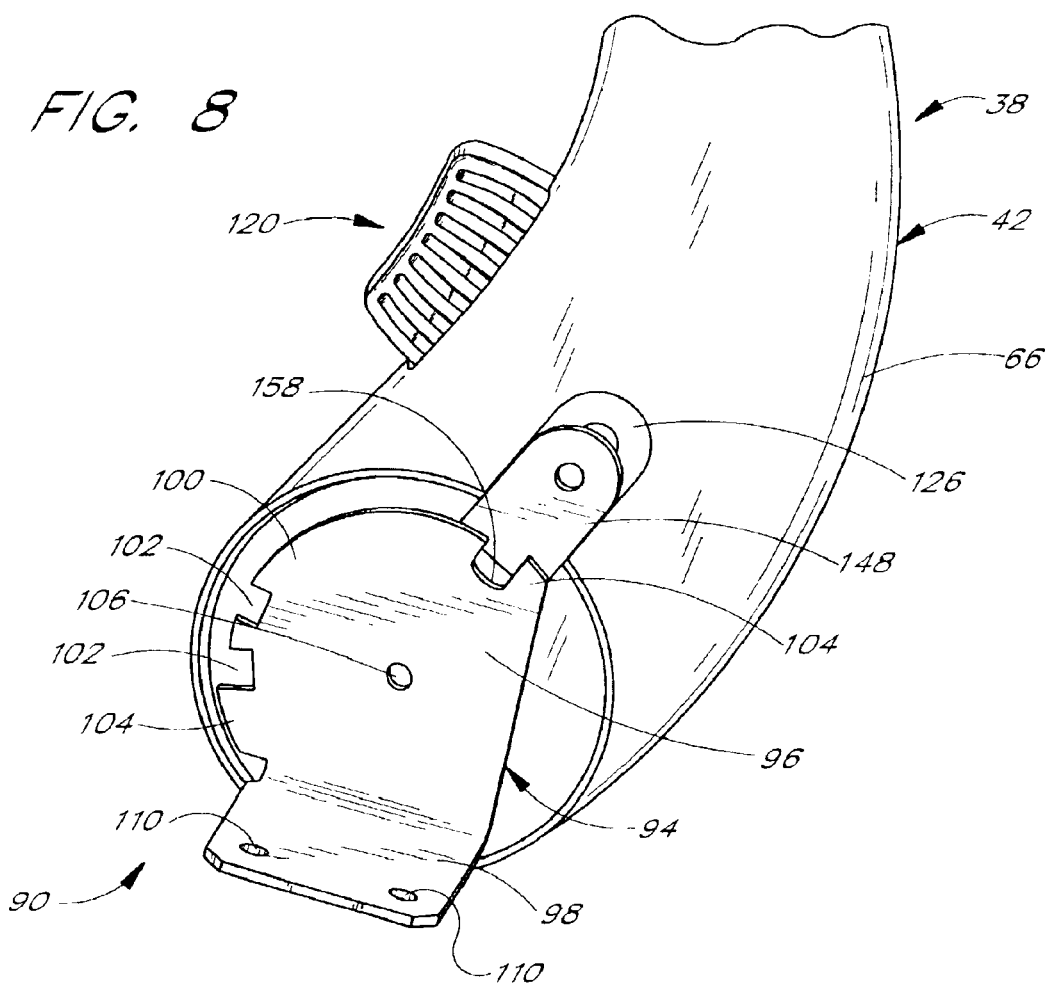
FIG. 8 is a perspective view of one of the handle lock mechanisms of the infant car seat.

With reference now to FIG. 8, a lock mechanism 90 preferably is provided at the end of each of the handle arms 42 to lock the handle assembly 38 in a desired rotational position relative to the seat shell 22. In the illustrated embodiment, each lock mechanism 90 includes a handle position stamping 94, preferably made of sheet steel, having a generally planar upright portion 96 and a flange 98 extending inwardly towards the seat shell 22 at approximately a right angle from the upright portion 96.

The upright portion 96 preferably has a generally circular front perimeter 100 with a plurality of notches 102 formed therein. In the illustrated embodiment, three notches 102 are provided in the perimeter 100 of the upright portion 96. Each of the notches 102 corresponds to a different "locked" rotational position of the handle assembly 38. A stop 104 is provided at each end of the perimeter 100 of the upright portion.

An opening 106 is provided through the center of the upright portion 96 for passage of one of the rivets 44 (see FIG. 1), which connect the handle assembly 38 to the handle position stamping 94. A pair of openings 110 are provided through the flange 98 of the position stamping 94. The position stamping 94 preferably is connected to the seat shell 22 by a pair of fasteners (not shown) that extend through the openings 110 in the flange 98 and into the seat shell 22.

Figure 9:
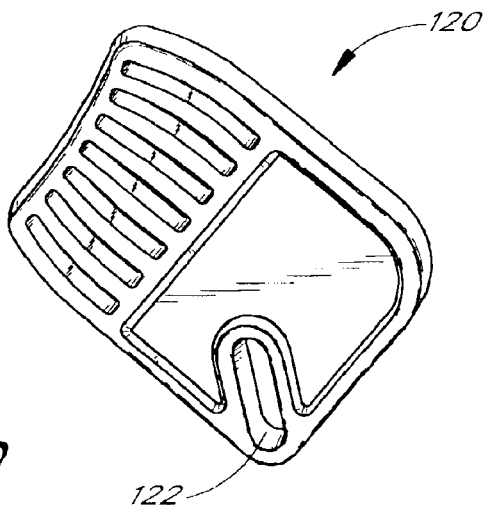
FIG. 9 is a perspective view of the actuator of the handle lock mechanism.

In the illustrated handle assembly 38, a pocket 116 (see FIG. 12) is provided in a front surface of the third arm portion 66 of each handle arm 42. An actuator 120 is movably positioned in each of the pockets 116. As illustrated in FIG. 9, an elongated slot 122 preferably is provided at a rear end of the actuator 120. In the illustrated embodiment, the slot 122 extends upwardly and forwardly from the rear end of the actuator 120 at an angle relative to the bottom surface of the actuator 120.

Figure 10:
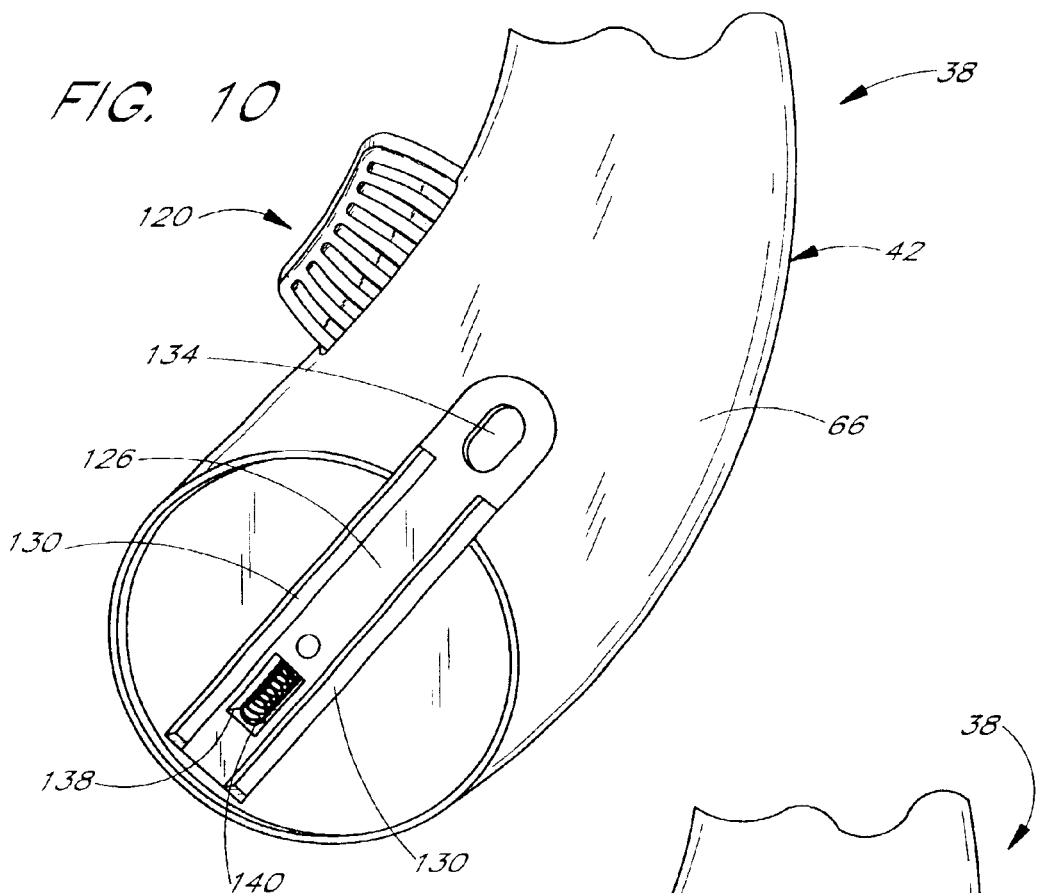
FIG. 10 is a perspective view of the handle lock mechanism with the position stamping and the latch of the lock mechanism removed.

With reference now to FIG. 10, a channel 126 is preferably provided at the end of each of the handle arms 42. In the illustrated embodiment, the channel 126 extends in a direction generally perpendicular to a direction of travel of the actuator 120. A track 130 extends along each side of the channel 126.

An elongated opening 134 is provided in each handle arm 42 on a side of the handle arm 42 facing the seat shell 22. In the illustrated embodiment, the elongated opening 134 is provided near a proximal end of the channel 126 (i.e., the end of the channel 126 nearest the grip portion 40 of the handle assembly 38). An opening 136 is similarly provided in each handle arm 42 on a side of the handle arm 42 opposite the seat shell 22 (see FIGS. 1 and 4). A recessed area 138 is provided near a distal end of the channel 126 to accommodate a biasing member 140. In the illustrated embodiment, the biasing member 140 is a coil spring.

Figure 11:
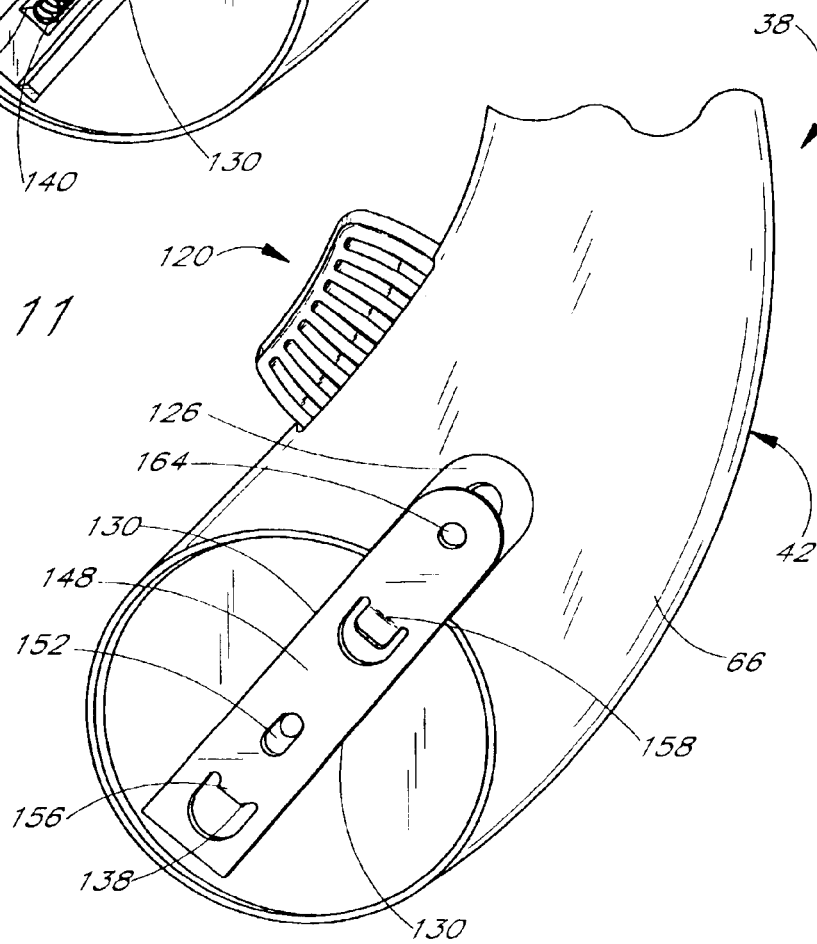
FIG. 11 is a perspective view of the handle lock mechanism with the position stamping removed.

With reference to FIG. 11, a latch 148 having a shape generally corresponding to the shape of the channel 126 is slidably positioned in the channel 126. The latch 148 is preferably also made of sheet steel and comprises a slotted opening 152 for passage of one of the rivets 44 (see FIG. 1) that connect the handle assembly 38 to the seat shell 22. The sides of the latch 148 are preferably bent outwardly to extend into the tracks 130 along the sides of the channel 126 to help retain the latch 148 in place in the channel 126.

In the illustrated embodiment, the latch 148 comprises a first tab 156 and a second tab 158. The first tab 156 extends into the recessed area 138 near the distal end of the channel 126. The biasing member 140 acts against a top surface of the first tab 156 to bias the latch 148 towards the distal end of the channel 126. The second tab 158 extends inwardly from the latch 148 towards the position stamping 94 (see FIG. 8). A through hole 164 is provided in a proximal end of the latch 148.

Figure 12:
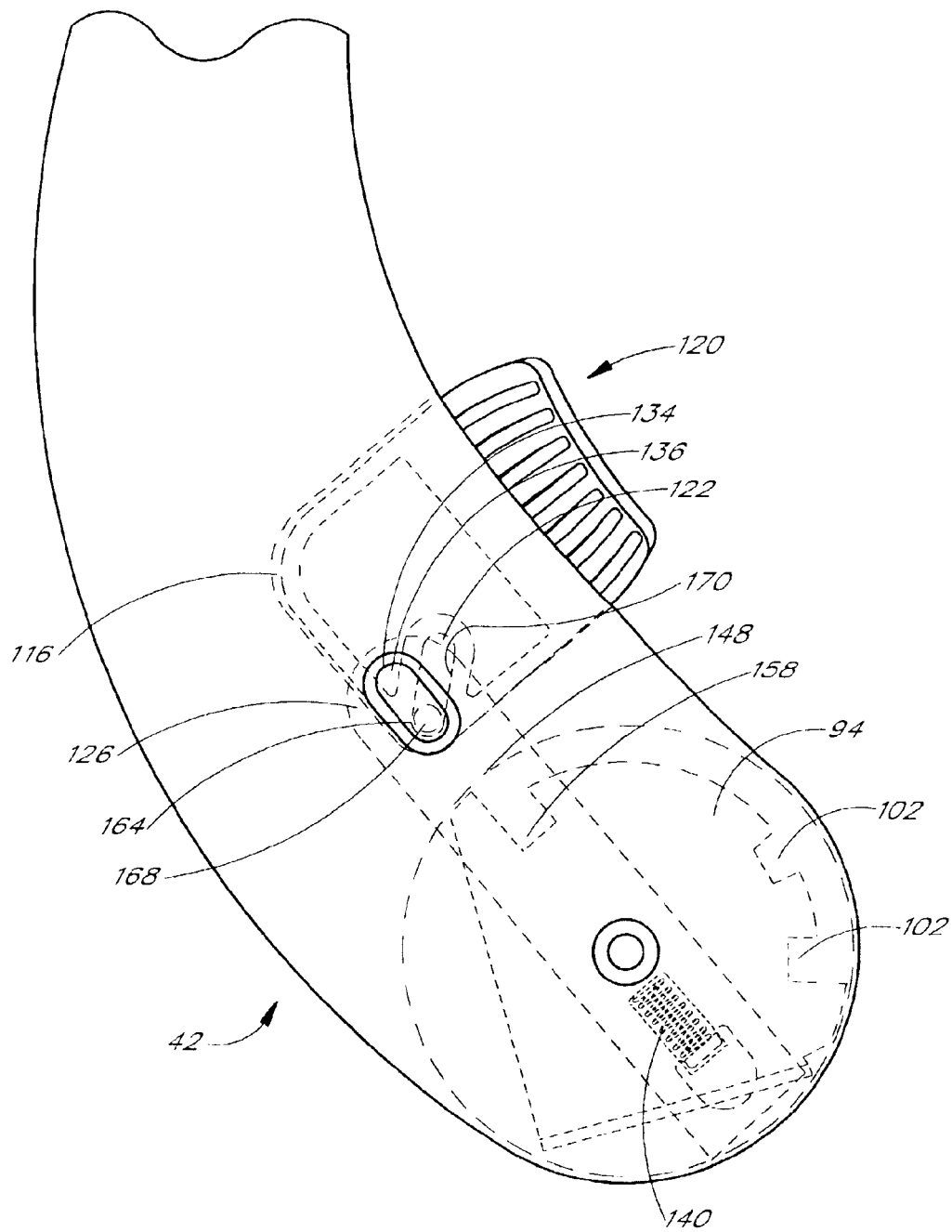
FIG. 12 is a side elevational view of the handle lock mechanism.

With reference now to FIG. 12, when the actuator 120 is positioned in the pocket 116, the elongated slot 122 at the end of the actuator 120 is aligned with the through hole 164 in the proximal end of the latch 148 and with the elongated openings 134, 136 in the sides of the handle arm 42. A rivet 168 or other suitable fastener extends through the elongated openings 134, 136 in the sides of the handle arm 42, through the elongated slot 122 in the actuator, and through the hole 164 in the proximal end of the latch 148 to connect the actuator 120 and the latch 148. Preferably, the ends of the rivet 168 have a diameter larger than a width of the elongated openings 134, 136 in the sides of the handle arm 42 to retain the rivet in the elongated openings 134, 136.

In the illustrated embodiment, the actuator 120 is movable in the pocket 116 in a direction generally perpendicular to the direction of travel of the latch 148. As the actuator 120 is moved into the pocket 116, the rivet 168 abuts and slides along a lower surface 170 of the slot 122 in the actuator 120. The lower surface 170 of the slot 122 acts as a cam surface to lift the rivet 168, which acts as a follower, and thereby slide the latch 148 towards the proximal end of the channel 126.

With reference to FIGS. 8 and 12, when the actuator 120 is pressed and the latch 148 is at the proximal end of the channel 126, the second tab 158 of the latch 148 is raised above the perimeter 100 of the position stamping 94. The handle assembly 38 can then be rotated relative to the seat shell 22. The stops 104 preferably extend above the perimeter 100 of the position stamping 94 so that, even when the actuator 120 is pressed, the second tab 158 of the latch 148 will abut the stops 104 to prevent rotation of the handle assembly 38 beyond the front perimeter 100 of the position stamping 94.

When the actuator 120 is released, the biasing member 140 biases the latch 148 towards the distal end of the channel 126 so that the second tab 158 of the latch 148 abuts the perimeter 100 of the position stamping 94. When the handle assembly 38 is positioned so that the second tab 158 is aligned with one of the notches 102 in the position stamping 94, the second tab 158 is forced into the notch 102 by the biasing member 140. The second tab 158 interferes with the sides of the notch 102 to prevent the handle assembly 38 from being further rotated relative to the seat shell 22. In order to rotate the handle assembly 38 to another position, the actuator 120 must again be pressed to raise the latch 148 and thereby raise the second tab 158 out of the notch 102.

In FIGS. 8 and 12, the handle assembly 38 is positioned so that the second tab 158 resides in the uppermost notch 102. In the illustrated embodiment, when the second tab 158 resides in the uppermost notch 102, the handle assembly 38 extends above the seat shell 22 to allow the user to lift and transport the car seat 20, as illustrated in FIGS. 5–7. When the second tab 58 resides in the middle notch 102, the handle assembly 38 extends behind the seat shell 22, for example, to more conveniently allow an infant to be placed in or removed from the car seat 20. When the second tab 58 resides in the lower notch 102, the handle assembly 38 extends below the head end 24 of the seat shell 22 to provide a more stable base for the car seat 20 when the car seat 20 is set on a surface. As will be apparent to those skilled in the art, additional or fewer notches 102 can be provided along the perimeter 100 of the position stamping 94, as desired, to enable the handle assembly 38 to be locked in any number of predetermined rotational positions relative to the seat shell 22.

When the second tab 158 is engaged in one of the notches 102, the actuator 120 pops out of the pocket 116, thereby clearly indicating that the lock mechanism 90 is positively engaged. Unlike some prior art handle lock assemblies that include plastic components which have a tendency to fail, the relatively high strength steel latch 148 and steel position stamping 94 cooperate to safely prevent rotation of the handle assembly 38 relative to the seat shell 22 even under relatively high loads.

Although the invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. An infant car seat comprising:
a seat shell; and
a handle comprising a generally triangular grip portion and a pair of handle arms extending generally perpendicular from said grip portion, each of said handle anus being rotatably connected to said seat shell at an end of said handle arm opposite said grip portion, wherein said grip portion comprises a first grip section extending generally perpendicular to a central longitudinal axis of said seat shell, a second grip section and a third grip section, said second and third grip sections extending inwardly towards said central longitudinal axis from opposite ends of said first grip section.

2. The car seat of claim 1, wherein said handle arms extend from said ends of said first grip section.

3. An infant car seat comprising:
a seat shell; and
a handle comprising a grip portion and a pair of handle arms extending from said grip portion, each of said handle arms being rotatably connected to said seat shell at an end of said handle arm opposite said grip portion, said grip portion comprising a first grip section extending generally perpendicular to a central longitudinal axis of said seat shell, a second grip section and a third grip section, said second and third grip sections extending inwardly towards said central longitudinal axis from opposite ends of said first grip section.

4. The car seat of claim 3, wherein said third grip section extends at an angle α with respect to said central longitudinal axis of approximately 30 degrees and said second grip section extends at an angle β with respect to said central longitudinal axis of approximately 330 degrees.

5. The car seat of claim 3, wherein said first, second and third grip sections are approximately the same length.

6. The car seat of claim 3, wherein each of said handle arms comprises a first arm portion extending forwardly from said grip portion towards a head of said seat shell when said handle is positioned so that said grip portion is above said seat shell, a second arm portion extending rearwardly from said first arm portion, and a third arm portion extending forwardly from said second arm portion.

7. An infant car seat, comprising:
 a seat shell;
 a handle comprising a grip portion and a pair of handle arms extending from said grip portion, each of said handle arms being rotatably connected to said seat shell at an end of said handle arm opposite said grip portion; and
 a handle lock mechanism associated with at least one of said handle arms, said handle lock mechanism comprising:
 a latch slidably connected to said at least one handle arm, said latch comprising a tab extending towards said seat shell such that said tab points in a direction that intersects a plane in which said handle arms rotate;
 a plurality of locking surfaces associated with said seat shell;
 an actuator operable to slide said latch between a first position wherein said tab interferes with said locking surfaces to prevent rotation of said handle with respect to said seat shell, and a second position wherein said tab does not interfere with said locking surfaces and said handle is allowed to rotate with respect to said seat shell; and
 a biasing member biasing said latch towards said first position.

8. The car seat of claim 7, wherein said lock mechanism further comprises a position stamping connected to said seat shell, and said locking surfaces comprise notches formed in a perimeter of said position stamping.

9. The car seat of claim 8, wherein said tab extends into one of said notches when said latch is in said first position.

10. The car seat of claim 7, wherein a portion of said latch extends into a recess formed in said at least one handle arm, and said biasing member comprises a coil spring located in said recess, said coil spring applying a force on said portion of said latch extending into said recess to bias said latch towards said first position.

11. The car seat of claim 7, wherein said actuator comprises a cam surface that extends into a pocket formed in said at least one handle arm.

12. The car seat of claim 11, further comprising a follower associated with said latch, said follower moving across said cam surface when said actuator is operated, causing said latch to move from said first position to said second position.

13. The car seat of claim 7, wherein said grip portion comprises a first grip section extending generally perpendicular to a central longitudinal axis of said seat shell, a second grip section and a third grip section, said second and third grip sections extending inwardly towards said central longitudinal axis from opposite ends of said first grip section.

14. An infant car seat comprising:
 a seat shell;
 a handle rotatably connected to said seat shell; and
 a handle lock mechanism, comprising:
 a position stamping connected to said seat shell;
 a latch slidably connected to said handle, said latch comprising a tab extending towards said seat shell such that said tab points in a direction that intersects a plane in which said handle arms rotate;
 a biasing member biasing said latch towards a first position wherein said tab cooperates with said position stamping to prevent rotation of said handle relative to said seat shell; and
 an actuator operable to slide said latch to a second position wherein said tab is moved away from said position stamping and said handle is allowed to rotate relative to said seat shell.

15. The car seat of claim 14, wherein said position stamping comprises a plurality of notches formed in a perimeter thereof, said tab extending into one of said notches when said latch is in said first position.

16. The car seat of claim 14, wherein a portion of said latch extends into a recess formed in said handle, and said biasing member comprises a coil spring located in said recess, said coil spring applying a force on said portion of said latch extending into said recess to bias said latch towards said first position.

17. The car seat of claim 14, wherein said actuator comprises a cam surface that extends into a pocket formed in said handle.

18. The car seat of claim 17, further comprising a follower associated with said latch, said follower moving across said cam surface when said actuator is operated, causing said latch to move from said first position to said second position.

19. An infant car seat comprising:
 a seat shell; and
 a handle comprising a triangular grip portion and a pair of handle arms extending from said grip portion, said triangular grip portion having a first side, a second side, and a third side, the first side being connected to the second side and the third side, the second side being connected to the first side and the third side, and the third side being connected to the first side and the second side, each of said handle arms being rotatably connected to said seat shell at an end of said handle arm opposite said grip portion.

20. The car seat of claim 19, wherein said first side is positioned generally perpendicular to a central longitudinal axis of said seat shell, and said second side and said third side extend inwardly towards said central longitudinal axis from opposite ends of said first side.

21. The car seat of claim 19, wherein said first side, said second side, and said third side are in one plane.

22. An infant car seat comprising:
 a seat shell;
 a handle rotatably connected to said seat shell; and
 a handle lock mechanism, comprising:
 a position stamping having a generally planar portion connected to said seat shell;
 a latch slidably connected to said handle, said latch comprising a tab extending towards said position stamping;
 a biasing member biasing said latch towards a first position wherein said tab cooperates with said position stamping to prevent rotation of said handle relative to said seat shell; and
 an actuator operable to slide said latch to a second position wherein said tab is moved away from said position stamping and said handle is allowed to rotate relative to said seat shell.

23. The infant car seat of claim 22, wherein planar portion of the position stamping has a plurality of notches, and in said first position, the tab sits within one of said notches.

24. The infant car seat of claim 22, wherein the generally planar portion has a generally circular perimeter.

25. The infant car seat of claim 24, wherein the generally planar portion has a plurality of notches.

26. The infant car seat of claim 25, wherein in said first position, said tab sits within one of said notches.

27. The infant car seat of claim 24, wherein in said second position the tab abuts the generally circular perimeter of the generally planar portion.

* * * * *

UNITED STATES PATENT AND TRADEMARK OFFICE
CERTIFICATE OF CORRECTION

PATENT NO. : 6,913,313 B2  
DATED : July 5, 2005  
INVENTOR(S) : Mark A. Sedlack It is certified that error appears in the above-identified patent and that said Letters Patent is hereby corrected as shown below:

Column 6,  
Line 40, delete "anus" and insert -- arms --.

Column 9,  
Line 1, after "wherein" insert -- the generally --.

Signed and Sealed this

Seventh Day of February, 2006

JON W. DUDAS  
*Director of the United States Patent and Trademark Office*